INVENTOR.
ADOLF R. MARKO
BY Harry A. Herbert Jr. and Robert Kern Duncan
ATTORNEYS

INVENTOR.
ADOLF R. MARKO

BY Harry A. Herbert Jr.
Robert Kern Duncan and

ATTORNEYS

INVENTOR.
ADOLF R. MARKO
BY Harry A. Herbert Jr.
Robert Kern Duncan and
ATTORNEYS United States Patent Office 3,530,236

Patented Sept. 22, 1970

3,530,236

SIGNAL CONVERTER TO DISPLAY PHYSIOLOGICAL SIGNALS ON CONVENTIONAL TELEVISION RECEIVERS

Adolf R. Marko, Fairborn, Ohio, assignor to the United States of America as represented by the Secretary of the Air Force Filed July 30, 1968, Ser. No. 748,746
Int. Cl. H04n *5/38*
U.S. Cl. 178—6.8 6 Claims

ABSTRACT OF THE DISCLOSURE

Direct current potentials from conventional physiological measuring instruments are converted to modulate sweep signals which modulate a radio frequency carrier providing a radio frequency signal such that when connected to the antenna input of a conventional home entertainment television receiver the physiological measurements will appear in the form of bar graphs on the television picture tube. Adjustable upper and lower safe limit lines across the bar graphs are provided to indicate the limits of acceptable deviations in the physiological measurements before a dangerous condition occurs.

BACKGROUND OF THE INVENTION

The field of this invention is in the art of apparatus for displaying physiological measurements.

The display of vital physiological signals such as heart rate, respiration rate, body temperature, blood pressure, skin response, oxygen consumption, partial oxygen pressure and others, is an established practice in medical monitoring of patients, astronauts, test pilots, and research workers in dangerous environments. Special display oscilloscopes have been used. These display oscilloscopes are very expensive, difficult to move to different laboratories and require as many wire lines as there are signals to monitor. Multiple monitoring and relatively remote monitoring is complicated and difficult to the extent of being largely prohibitive.

SUMMARY OF THE INVENTION

The invention disclosed herein comprises an electronic converter which accepts the signals from conventional physiological sensing devices and produces a video signal modulating a (television) radio frequency carrier that is compatible to and receivable by unmodified commercial television receivers. One or several television sets may be connected by one coaxial cable or twin lead to the converter and a bar graph will be displayed on each television screen indicative of the physiological measurements being made. The response of the system is limited only by the response of physiological sensing instruments being used. Thus continuous and practically instantaneous monitoring of the subject may be observed. In order to facilitate the monitoring of a subject by inexperienced personnel, upper and lower "safe" limit lines are provided so that when a dangerous situation develops experienced personnel may be summoned. The number of displayed signals is generally limited by the practical consideration of patient comfort and the activity in which the patient (or subject) is engaged. In most applications not more than three or four physiological measurements need to be monitored. In the embodiment of this invention set forth in detail, provisions for monitoring four measurements are shown. It is to be understood that by the simple addition of similar pairs of trigger circuits and correspondingly increasing the number of gates that provision for additional monitored measurements may be provided.

DESCRIPTION OF THE PREFERRED EMBODIMENT

Figure 1:
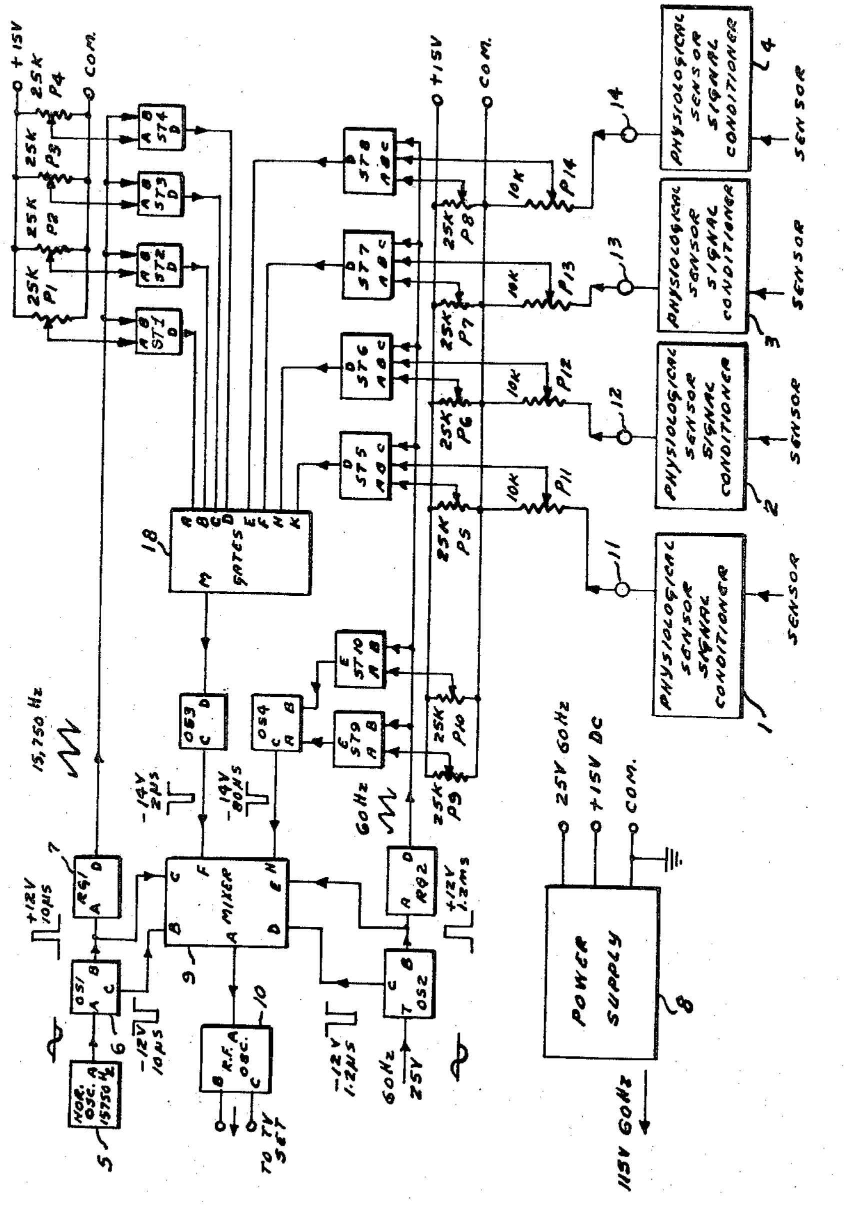
FIG. 1 is a block diagram of the invention.

FIG. 1 is a block diagram of the complete signal converter system. The physiological signal conditioners 1, 2, 3, and 4 and their associated sensors are conventional instruments and not a part of this invention. The crystal controlled sine wave oscillator 5 produces about 10 volts peak-to-peak output at a frequency of 15,750 Hz., the standardized horizontal deflection frequency used in commercial entertainment television. The one shot multivibrator 6 triggered by this oscillator generates positive and negative pulses (10 microseconds duration) which are used to provide the horizontal blanking and synchronization pulses of the video signal and to trigger linear ramp generator 7 (designated RG1). The linear ramp voltage output of RG1 is connected to four Schmitt trigger circuits ST1 to ST4 which in turn are also controlled by the voltages derived from four potentiometers P1 to P4. Potentiometers P1 to P4 are used to set the horizontal positions of the four graph-bars on the television screen.

A 60 Hz. sine wave voltage is taken from the power supply 8 for the reference frequency signal of the vertical sweep circuits. This 25 volt 60 Hz. signal triggers the one shot multivibrator OS2 which produces positive and negative pulses of approximately 1.2 millisecond duration. These pulses are used to supply the vertical blanking and synchronization pulses to the video signal and to trigger the linear ramp generator RG2 which in turn produces input signals for the six Schmitt triggers ST5 to ST10. The Schmitt triggers ST5 to ST8 are additionally controlled by voltages derived from the potentiometers P5 to P8 and from voltages furnished by the signal conditioners 1, 2, 3 and 4. Potentiometers P5 to P8 are used to set the vertical baseline position of the four graphs bars. The Schmitt triggers ST9 and ST10 are employed to generate the upper and lower "safe" limit lines on the television screen and each is adjustable in its vertical position by the potentiometers P9 and P10. If it is desired to provide the graph bars only the limit lines may be eliminated by omitting the triggers ST9 and ST10.

To separate the graph bars the potentiometers P1 to P4 are set to provide different firing levels and the Schmitt triggers ST1 to ST4 will thus fire in sequence according to the voltage level set for each trigger (highest level first, lowest level last). The sequence will repeat itself at 15,750 times per second or for each horizontal line. The firing order of the Schmitt triggers ST5 to ST8 is determined by the physiological input signals (from the conditioners) and by the setting of the potentiometers P5 to P8 and thus varies according to the input signals, providing graph bars whose heights correspond to the magnitude of their respective physiological measurements.

The block 18, "gates," is a circuit containing diode gates with each gate connected to a pair of Schmitt triggers, like the first gate handles ST1 and ST5, the second gate ST2 and ST6, the third gate ST3 and ST7, and the fourth gate ST4 and ST8. Only when the output voltage of the Schmitt trigger ST5 is positive a pulse from the circuit ST1 is able to pass the gate and trigger the one shot multivibrator OS3. Similar statements are applicable for the other gates cooperating with their respective Schmitt trigger pairs ST6/ST2, ST7/ST3, and ST8/ST4. (These gating circuits are set forth in detail in FIG. 7 and will be further elaborated on later.)

Outputs from the Schmitt triggers ST9 and ST10 trigger the one shot multivibrator OS4 which generates negative pulses of approximately 80 microseconds duration. This provides the pulses that combine with the complex video signal to provide the two limit lines.

The output from the gating circuits triggers the one shot multivibrator OS3 which provides a negative going pulse having a predetermined pulse width of approximately two microseconds duration. These pulses from the output of OS3 combine with those from OS4 to provide that portion of the video signal responsible for the four graph bars and the two limit lines.

In the mixer 9 the horizontal and vertical blanking and synchronization pulses are added to the foregoing enumerated "picture" portions of the signal to provide the complete video signal. (The mixer circuit is shown in detail in FIG. 8.) This complete video signal from the mixer modulates the carrier amplitude of the radio frequency oscillator 10. The modulated radio frequency signals from the R.F. oscillator are generally connected by conventional 300 ohms twin lead television antenna cable to one or several conventional television receivers for the display of the physiological measurements. The twin lead from the output of the R.F. oscillator of the signal converter may be connected to the antenna binding posts of the television set or clipped to the antenna ("rabbit ears") of the set as shown in FIG. 9.

Figure 9:
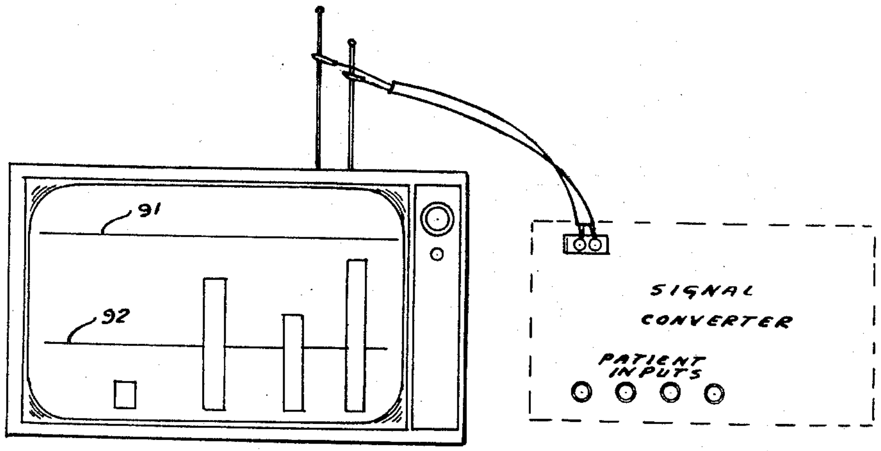
FIG. 9 is a pictorial representation of a display of one embodiment of the invention.

The representative illustration shown in FIG. 9 is a typical display with the sensor actuating the first graph bar indicating a dangerous situation in that it is below the lower safe limit line 92. Due to limitation of not being able to show shades of grey in the drawing, the picture presented by FIG. 9 cannot be shown quite correctly. It is to be understood that the limit lines 91 and 92 are really white lines across a grey screen—not black lines as shown. The vertical graph bars are white bars on the grey screen.

Generally it is desirable to tune the radio frequency oscillator 10 (FIG. 1 and shown in detail in FIG. 6) to a locally unused channel of the television band in order to keep any interference to a minimum. In areas where all VHF channels are used, the system may be tuned to any channel but any built-in or attached antennas of the television sets should be disconnected. This can normally be done without having to open the television set. The signal generated by the R.F. oscillator of this invention is many times stronger than the television signal picked up by a receiver without an antenna and will therefore produce a clear picture even on a channel occupied by a commercial television broadcasting station. While four physiological inputs are shown in FIG. 1, obviously a direct current voltage of the range from zero to approximately five volts may be substituted in place of a physiological measuring instrument and shown graphically in magnitude on the TV screen. For instance, room or environmental temperature may be displayed along with three physiological measurements, or any other signals that it is desired to display in bar graph form, may be connected to the input terminals 11, 12, 13 and 14.

The following detailed description of the circuits represented in block diagram are given to aid in the comprehension and practice of this invention. While these specific circuits are typical and have given very satisfactory operation in a working embodiment of the invention, it is to be recognized that departures may be made in the electric parameters of these circuits or that different electrical circuits may be substituted to perform the same circuit function. For instance other well-known types of trigger circuits may be used in place of the particular Schmitt circuit illustrated.

Figures 2, 3, 4, 5:
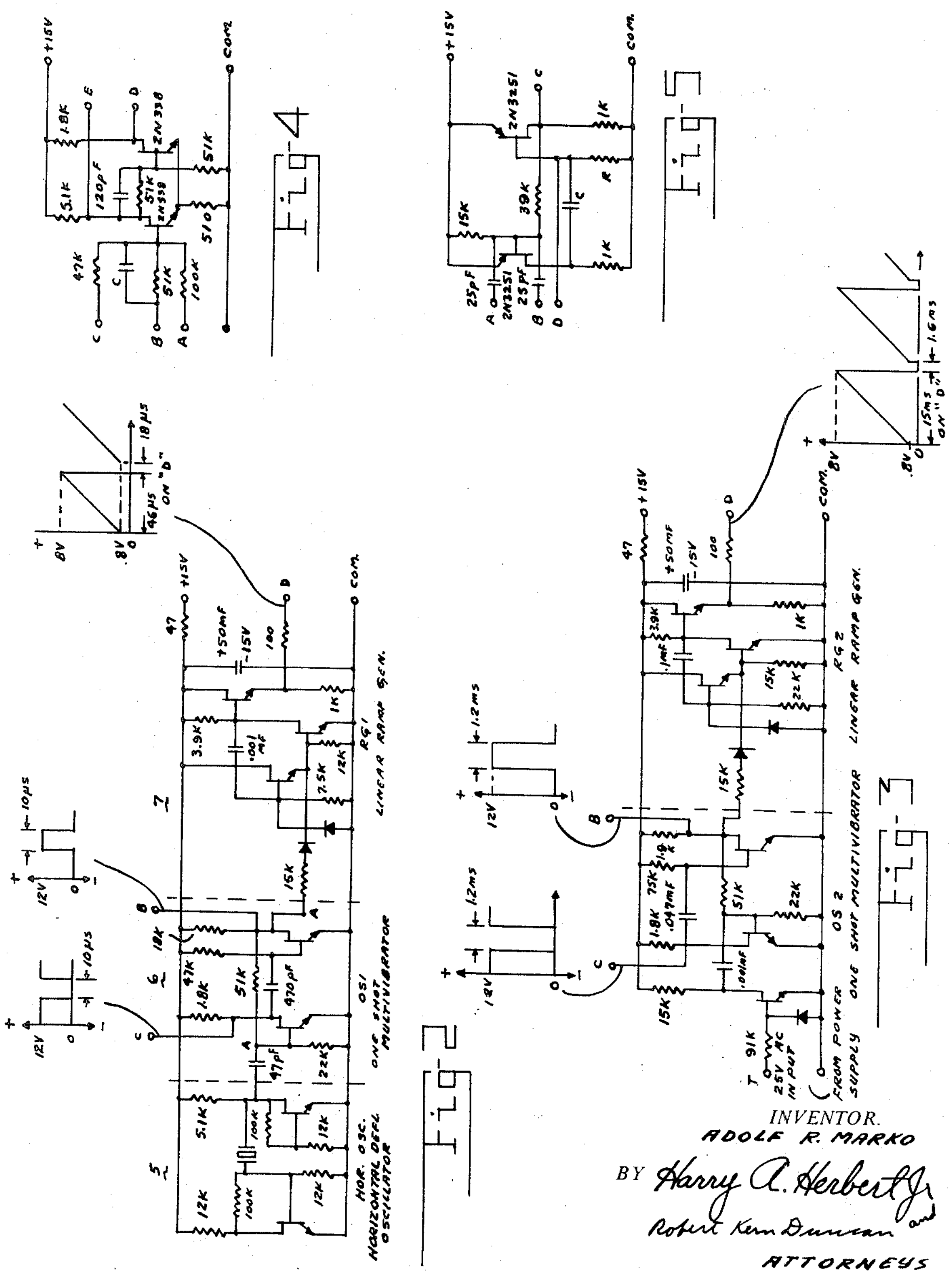
FIG. 2 is a schematic diagram of the horizontal sweep circuits.
FIG. 3 is a schematic diagram of the vertical sweep circuits.
FIG. 4 is a schematic diagram of the trigger circuits.
FIG. 5 is a schematic diagram of the one shot multivibrator circuits.

FIG. 2 is a detailed schematic diagram of the horizontal deflection circuits. The conventional crystal controlled oscillator (15.750 kHz.) triggers the one shot multivibrator OS1 which in turn triggers the linear ramp generator RG1. The linear ramp generator is a simple conventional Miller integrator. The linearity and stability of this simple circuit are less than those of an operational integrator but this circuit has proven very satisfactory for this invention. However, with the increasing availability of inexpensive miniature operational amplifiers which perform very well, it is to be understood that such circuits may be substituted for the circuit shown. In the specific embodiment herein detailed in FIG. 2 the transistors used were type 2N338 and the diodes were type 1N486.

FIG. 3 is a schematic diagram of the vertical deflection circuits. They are similar to the previously described horizontal circuits except for the longer time constants and the crystal controlled oscillator which is replaced by a 60 Hz. voltage derived from the power transformer. The transistors are type 2N338 and the diodes are type 1N486. The typical wave forms shown in FIGS. 2 and 3 are self-explanatory and will aid in the comprehension and practice of this invention.

The circuit of the Schmitt triggers ST1 through ST10 of FIG. 1 are shown in detail in FIG. 4. They are all alike except for the input capacitor C which is 100 pf. for ST1 to ST4 and .001 mf. for ST5 to ST10.

The circuit of the one shot multivibrators OS3 and OS4 is shown in detail in FIG. 5. They differ only in the values of C and R, C being 330 pf. and R being 22K for OS3 and .0022 mf. and 75K for OS4, respectively.

Figure 7:
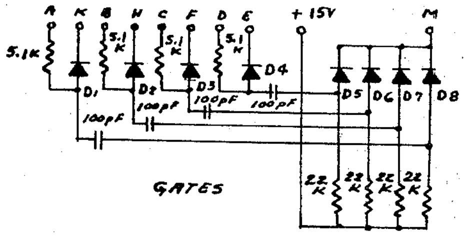
FIG. 7 is a schematic diagram of the gate circuits.

The gating circuit is shown in detail in FIG. 7. The diodes D1 to D4 are type 1N69 and D6 to D8 are type 1N486B. The diodes D1 to D4 conduct and short and positive voltages arriving on the terminals A, B, C and D from the Schmitt triggers ST1, ST2, ST3, and ST4 until the terminals K, H, F, and E which are connected to the Schmitt triggers ST5, ST6, ST7 and ST8 become positive. Pulses from terminals A, B, C and D are differentiated by the 100 pf. capacitors and the 22 kilo ohm resistors. The positive halves of the differentiated pulses pass the diodes D5, D6, D7 and D8 and trigger the one shot multivibrator OS3 which produces the video signal pulses needed for generating the vertical graph bars.

Figure 8:
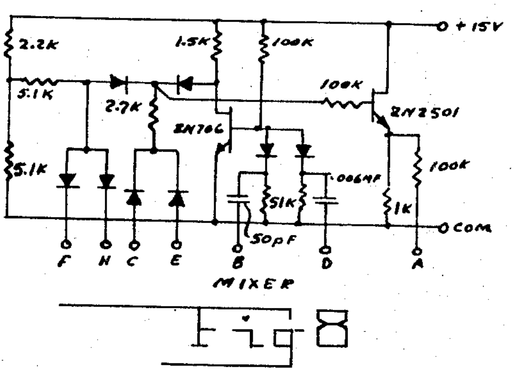
FIG. 8 is a schematic diagram of the mixer circuit.

The mixer 9 of FIG. 1 is detailed in FIG. 8. Its function is to combine the pulse signals and modulate the R.F. oscillator. The horizontal and vertical blanking pulses from the one shot multivibrators OS1 and OS2 are connected to terminals C and E. Video information pulses from OS3 and OS4 are fed to terminals F and H, while terminals B and D receive the negative going pulses from the one shot multivibrators OS1 and OS2. These latter pulses are shortened by the differentiating action of the capacitors (50 pf. and .006 mf.) and the 51K kilo ohm resistors. The inverting transistor 2N706 supplies via a diode the positive going horizontal and vertical synchronization pulses with the proper duration and magnitude. For separation purposes and low source impedance the combined video signal is passed through the 2N2501 emitter follower output stage. The diodes used in the mixer of this detailed embodiment are all a type 1N69.

Figure 6:
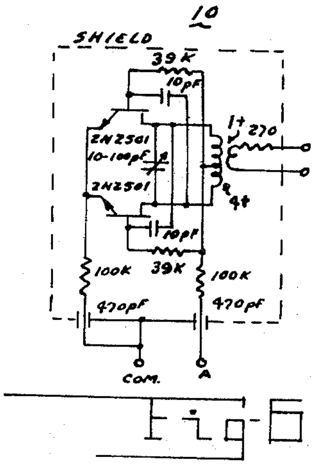
FIG. 6 is a schematic diagram of the radio frequency oscillator circuit.

The output terminal A of the mixer is connected to terminal A of the conventional radio frequency oscillator detailed in FIG. 6. The supply voltage of this push-pull oscillator is modulated by the video signal which provides approximately 40% amplitude modulation of the radio frequency carrier. The ceramic tuning capacitor (10 to 100 pf.) provides tuning of the oscillator between 50 mHz. and 90 mHz. (channel 2 to channel 6 portion of the commercial, entertainment, television frequency spectrum). It has been found desirable to shield the radio frequency oscillator to prevent extraneous radiation of the signal which might cause interference with normal television service. Those skilled in the art will ready understand how other oscillators covering other frequencies may readily be substituted for the oscillator detailed.

The conventional signal conditioners 1, 2, 3 and 4 of FIG. 1 are not considered part of this invention. As previously stated any sensing system providing at least approximately a maximum output of 5 volts direct current (as conventional physiological sensing systems do) may be used with the invention. The potentiometers P11, P12, P13 and P14 aid in setting the levels from the physiological sensing systems thus controlling the vertical amplitudes of the graph bars. Even though the sensor signal conditioners generally have output level adjustments incorporated within them they may be positioned somewhat remote from the signal converter. Potentiometers P9 and P10 determine the position of the safe limit lines, and it is convenient to be able to correlate at the signal converter the levels from the sensor systems with the limit lines.

I claim:

1. A signal converter for converting the signals from a plurality of physiological measuring instruments to a modulated radio frequency signal whereby the measurements are displayed as individual, respective, graph bars on conventional television receivers, the said signal converter comprising:

(a) a first generating means for providing a horizontal sweep voltage;

(b) a first plurality of adjustable trigger means, in one-to-one correspondence with the said plurality of physiological measuring instruments, cooperating with the said horizontal sweep voltage means for positioning horizontally each of the said graph bars;

(c) a second generating means for providing a vertical sweep voltage;

(d) a second plurality of adjustable trigger means, in in one-to-one correspondence with the said plurality of physiological measuring instruments, cooperating with the said vertical sweep voltage generating means and the said physiological measuring instruments for providing signal determinative of the height of each of the said graph bars in response to the magnitude of the respective physiological measurements;

(e) gating means cooperating with the said first and the second plurality of trigger means providing an output voltage;

(f) pulse generating means responsive to the said voltage output of the said gating means for providing an output pulse of a predetermined pulse width;

(g) radio frequency generating means for providing a radio frequency carrier signal;

(h) mixer means cooperating with the said horizontal sweep generating means, the said vertical sweep generating means, and the said pulse generating means for providing a video signal for amplitude modulating the said radio frequency carrier; and (i) connecting means cooperating with the said radio frequency generating means and the said television receiver for conducting the said modulated radio frequency carrier to the said television receiver.

2. The signal converter as claimed in claim 1 wherein:

(a) the said first generating means provides a standard television 15,750 Hz. horizontal sweep voltage; and (b) the said second generating means provides a 60 Hz. vertical sweep voltage.

3. The signal converter as claimed in claim 2 wherein: the said predetermined pulse width of the pulse generating means is approximately two microseconds.

4. The signal converter as claimed in claim 3 wherein: the said radio frequency generating means provides a tunable radio frequency carrier signal tunable from approximately 50 mHz. to approximately 90 mHz.

5. A signal converter for converting the signals from a plurality of physiological measuring instruments to a modulated radio frequency signal whereby the measurements are displayed as individual, respective, graph bars with upper and lower safe limit lines on conventional television receivers, the said signal converter comprising:

(a) a first generating means for providing a standard television horizontal sweep voltage of approximately 15,750 Hz.;

(b) a first plurality of adjustable trigger means, in one-to-one correspondence with the said plurality of physiological measuring instruments, cooperating with the said horizontal sweep voltage means for positioning horizontally each of the said graph bars;

(c) a second generating means for providing approximately a 60 Hz. vertical sweep voltage;

(d) a second plurality of adjustable trigger means, in one-to-one correspondence with the said plurality of physiological measuring instruments, cooperating with the said vertical sweep voltage generating means and the said physiological measuring instruments for providing signals determinative of the height of each of the said graph bars in response to the magnitude of the respective physiological measurement;

(e) gating means cooperating with the said first and the said second plurality of trigger means providing an output voltage;

(f) a first pulse generating means responsive to the said voltage output of the said gating means for providing an output pulse having a predetermined pulse width;

(g) a first adjustable trigger means responsive to the said vertical sweep voltage for providing an output voltage determinative of the said upper safe limit line;

(h) a second adjustable trigger means responsive to the said vertical sweep voltage for providing an output voltage determinative of the said lower safe limit line;

(i) a second pulse generating means responsive to the said output voltage of the first adjustable trigger means and the said output voltage of the second adjustable trigger means for providing an output pulse having a predetermined pulse width;

(j) tunable radio frequency generating means for providing a radio frequency carrier signal, tunable over at least a portion of the commercial entertainment television frequency spectrum;

(k) mixer means cooperating with the said horizontal sweep generating means, the said vertical sweep generating means, the said first pulse generating means, and the said second pulse generating means for providing a video signal for amplitude modulating the said radio frequency carrier; and (l) connecting means cooperating with the said radio frequency generating means and the said television receiver for conducting the said modulated radio frequency carrier to the said television receiver.

6. The signal converter as claimed in claim 5 wherein:

(a) the said predetermined pulse width of the first pulse generating means is approximately two microseconds; and (b) the said predetermined pulse width of the second pulse generating means is approximately eighty microseconds.

References Cited

UNITED STATES PATENTS

| | | | |
|---|---|---|---|
| 2,171,216 | 8/1939 | Koch | 315—26 |
| 2,394,196 | 2/1946 | Morgan | 315—26 |
| 2,480,636 | 8/1949 | Dieke | 324—121 |
| 2,848,648 | 8/1958 | Wolcott | 315—26 |
| 3,248,650 | 4/1966 | Bialkowski | 340—212 |
| 3,375,509 | 3/1968 | Mullarkey | 340—324.1 |

RICHARD MURRAY, Primary Examiner

J. A. ORSINO, JR., Assistant Examiner

U.S. Cl. X.R.

128—2.1; 178—7.1; 315—26; 324—121; 340—212